July 20, 1926.
C. C. TAYLOR
1,593,478
CONTROLLING DEVICE
Filed July 13, 1925
2 Sheets-Sheet 1
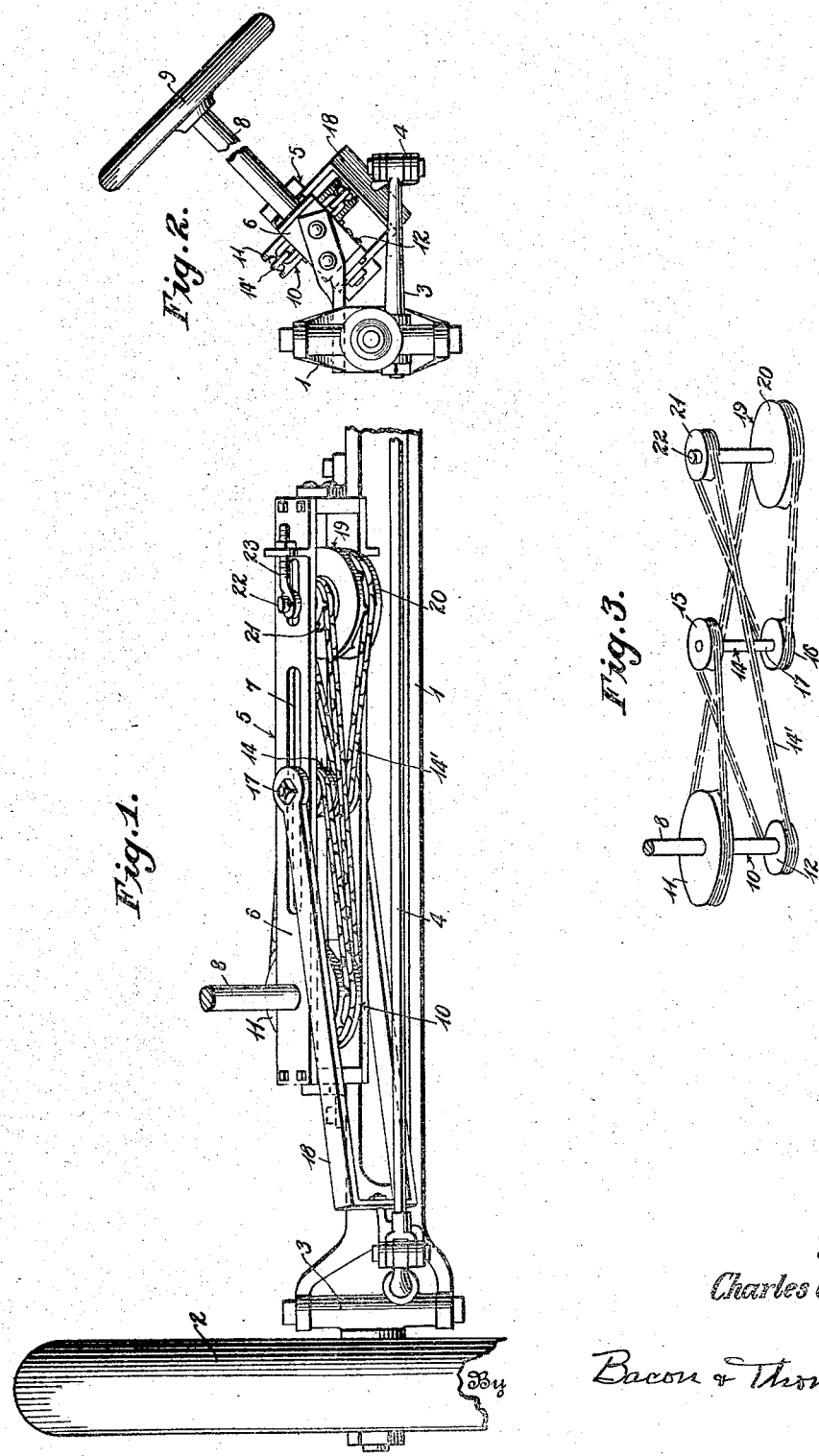
Inventor
Charles C. Taylor
By Bacon & Thomas
Attorneys July 20, 1926.

C. C. TAYLOR 1,593,478

CONTROLLING DEVICE

Filed July 13, 1925   2 Sheets-Sheet 2

Inventor
Charles C. Taylor

By Bacon + Thomas.

Attorneys

Patented July 20, 1926.

1,593,478

UNITED STATES PATENT OFFICE.

CHARLES C. TAYLOR, OF SAN DIEGO, CALIFORNIA.

CONTROLLING DEVICE.

Application filed July 13, 1925. Serial No. 43,353.

The invention relates to improvements broadly in a controlling device for transmitting movement to an element to be operated and for locking said element against movement by force applied directly thereto.

While the control device is capable of use in unlimited fields such, for instance, as in hoists elevators, and the like, it is highly applicable for use in connection with the steering wheels of motor vehicles by means of which the steering wheels may be turned through the operation of the steering shaft, while the control mechanism for imparting such power to the steering wheels serves to set the steering wheel to run in a given direction even though they encounter an obstacle or irregular road surface, as movement to the wheels can only be imparted through the steering shaft.

More specifically, the invention comprises a controlling mechanism interposed between the steering mechanism and the front wheels of a vehicle, which will act to transmit movement to said front wheels from the steering mechanism upon the operation of such mechanism, but will lock said wheels against movement by reason of any strains or forces applied directly to the wheels while traveling over a roadway, thereby keeping the front wheels set in a straight path and changing their direction only when the operator believes such a change to be necessary, and actuates said wheels through the steering mechanism.

In the drawings,

Fig. 1 designates the device as applied to the steering mechanism of an automobile.

Fig. 2 is a detail view, and

Fig. 3 is a view of the control mechanism.

Figure 4:
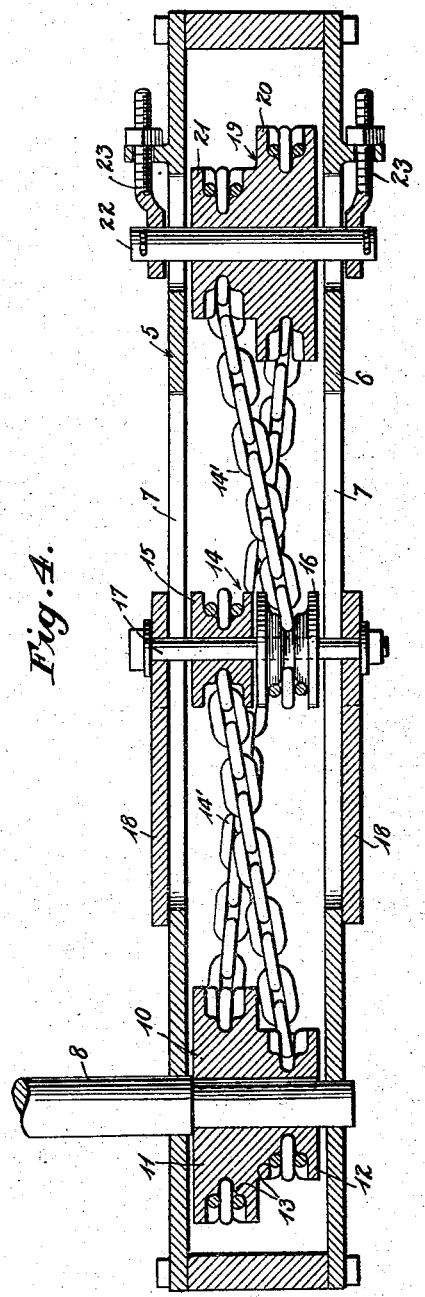
Figure 6:
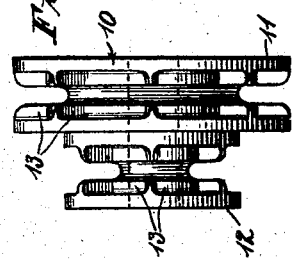
Figure 5:
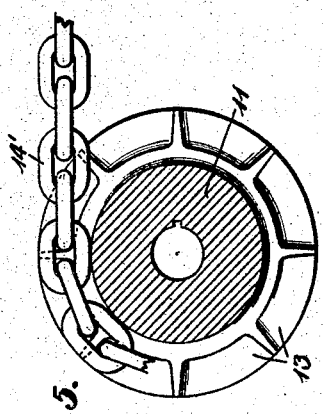

Fig. 4 is a sectional view of the device looking from the top. Fig. 5 is a side sectional view of one of the differential pulleys and chain employed in the device. Fig. 6 is an end view of one of the differential pulleys.

Referring now more particularly to the drawings, wherein like reference characters indicate corresponding parts, the numeral 1 designates the front axle of the motor vehicle having the usual steering wheels 2 thereon mounted on the steering knuckles 3 operated by the shift rod 4. Mounted on this axle is the control mechanism 5. This mechanism embodies a housing 6 which is united to the axle having elongated slots 7 in the side bars thereof in which slots a traveling pulley, to be later described, travels.

A steering column 8 connected with a steering wheel 9 leads downwardly through the vehicle and passes through an opening in the housing of the control mechanism 5. This steering rod has a spline connection with the differential pulley unit 10. This differential unit comprises large and small pulleys 11 and 12 mounted on the lower end of the steering rod 8. Each pulley is formed with sprocket teeth 13 for the purpose of engaging a power transmitting chain 14', which chain preferably is of the type commonly known as "cable chain", in a manner to be later described and providing, in effect, a sprocket connection between said pulleys and the chain. Intermediate the housing 5 is the traveling pulley unit 14. This unit comprises a pair of independently mounted rotating pulleys 15 and 16 disposed on the shaft 17, which shaft is connected with the arms 18 that in turn are connected with the shift rod 4 so that a movement of these arms is transmitted to the shift rod.

Disposed in the opposite end of the housing or frame is a second differential pulley unit 19 comprising the large pulley 20 and the small pulley 21 rotatably mounted on the shaft 22 and capable of adjustment in said frame by the adjusting elements 23 serving to move said pulley unit back and forth in the frame. It will be observed that the large pulley 20 of the differential pulley unit 19 is disposed in alinement with the small pulley 12 of the differential pulley unit 10. To transmit the rotary motion of the shaft 8 to the movable pulley unit 14, by means of which the shift rod 4 is operated through the agency of the connecting link 15 attached to the shiftable pulley unit, the power transmitting chain 14' is employed. This chain extends around the pulley 11 of unit 10, thence across to the opposed large pulley 20 of unit 19, thence to the small pulley 16 of the traveling unit 14, thence around the small pulley 21 of the differential pulley unit 19, then around the small pulley 12 of the differential unit 10, thence around the pulley 15 on the traveling pulley unit 14, and then back to the large pulley 11 of the differential pulley unit 10. Through this connection a rotary movement of the shaft 8 causes the traveling pulley unit 14 to move back and forth in the slots 7 depending upon the direction of rotation of the shaft 8. The movement of the traveling pulley unit, of course, likewise moves the connecting arm or link 18, which is connected with the shaft rod 4 so as to operate the steering knuckles and shift the steering wheels of the automobile. It will furthermore be noted that the rotary movement of the shaft 8 and a similar movement of the differential pulley unit 10 serves to bodily shift the traveling pulley unit 14 back and forth or gives this unit a reciprocating motion. This reciprocating motion is used in the present embodiment of the invention for operating the steering mechanism.

From the foregoing description, it will be apparent that the rotary movement of the steering shaft 8 permits the steering wheels to be operated through the control mechanism described. These wheels are, however, locked against any movement by reason of strains or forces applied to the wheels. The wheels are therefore maintained in a straight course, and their position will not shift unless through the operation of the steering shaft by the operator. Should the wheels run against obstacles on the road, they will not be deflected because the traveling pulley unit link 14 will transfer this strain to the pulley units 10 and 19 and the pulleys thereon, and by reason of the wrapping of the chain 14' around these pulleys, 11, 12, 20, and 21 and the pulleys 15 and 16 of the unit 14, this unit is firmly locked against any sliding movement in either direction. Any movement applied to the unit is taken up by the chains wrapped thereabout and transmitted to the differential pulley units at each end of the frame, thereby firmly locking the traveling pulley unit in its adjusted position, irrespective of the force applied thereto. It will be observed that a chain is utilized in this mechanism and that the differential pulley units are formed with teeth fitting the links of the chain.

It will furthermore be understood that this control mechanism is capable of other uses such, for instance, as in hoists, elevators, etc., or in fact, in any place where it is desirable to elevate or move a device and to cause said device to remain in a given position against any forces or strains when such movement discontinues. For instance, if used in a hoist, the traveling pulley unit may be moved to any desired position by the operation of the shaft rotating one of the differential pulleys, and as soon as this rotary movement discontinues, the traveling pulley unit will remain in the position it then occupies, irrespective of the strains placed thereon.

Having thus described the invention, what I claim is:

1. In a control device, an operating shaft, a differential pulley unit driven thereby having a pair of pulleys, a second rotary differential pulley unit having a pair of pulleys, an interposed traveling pulley unit having a pair of pulleys thereon, and a power transmitting chain traveling around all of said pulleys for shifting the traveling unit upon the rotation of one of the differential units.

2. A control device comprising a casing, a differential pulley unit having a large pulley and a small pulley, a shaft for rotating said pulleys, a second differential pulley unit comprising a large and small pulley, spaced from said first differential pulley unit, a traveling pulley unit between said pulleys, a pair of pulleys in said unit, an operating element connected with said unit, and a driving chain extending around all of said pulleys for reciprocating said traveling pulley unit upon the rotation of one of said differential pulleys and for locking said unit against movement by stresses applied thereto.

3. A control comprising a differential pulley unit having a pair of pulleys thereon, means for rotating said pulleys, a second differential pulley unit spaced from the first mentioned unit, a slidable traveling element, a driving chain for shifting said element upon the rotation of said first mentioned unit, said chain extending from the pulley around one pulley on the first unit, thence around the pulley on the second unit, thence in driving connection with said slidable traveling element, thence around a pulley on the second mentioned unit, thence around a pulley on the first mentioned unit, and then around said sliding element to said first mentioned pulley.

4. In a control, the combination with a frame, of a driving differential pulley unit journaled therein and having a pair of pulleys, a differential pulley unit spaced from the driving pulley unit and comprising a pair of pulleys, a traveling element between said pulleys, and a chain disposed around all of said pulleys and said traveling element for shifting the traveling element upon the rotation of the driving pulley but preventing movement of said traveling element in response to forces otherwise applied thereto.

5. In a steering mechanism, the combination with a steering column, of steering wheels, and means interposed between said column and said steering wheels for operating said wheels upon the actuation of the column while preventing a shifting of the wheels by forces applied directly thereto, said means comprising a controlling device having a driven differential pulley unit actuated with said column, a pair of pulleys in said unit, an idling differential pulley unit spaced from the driven pulley unit, a sliding element, a chain extending around said pulleys in both of said units and around said slidable element for shifting said element upon the rotation of the driving pulley unit, and a connection between said shiftable element and said steering wheels.

In testimony whereof I affix my signature.

CHARLES C. TAYLOR.